UNITED STATES PATENT OFFICE.

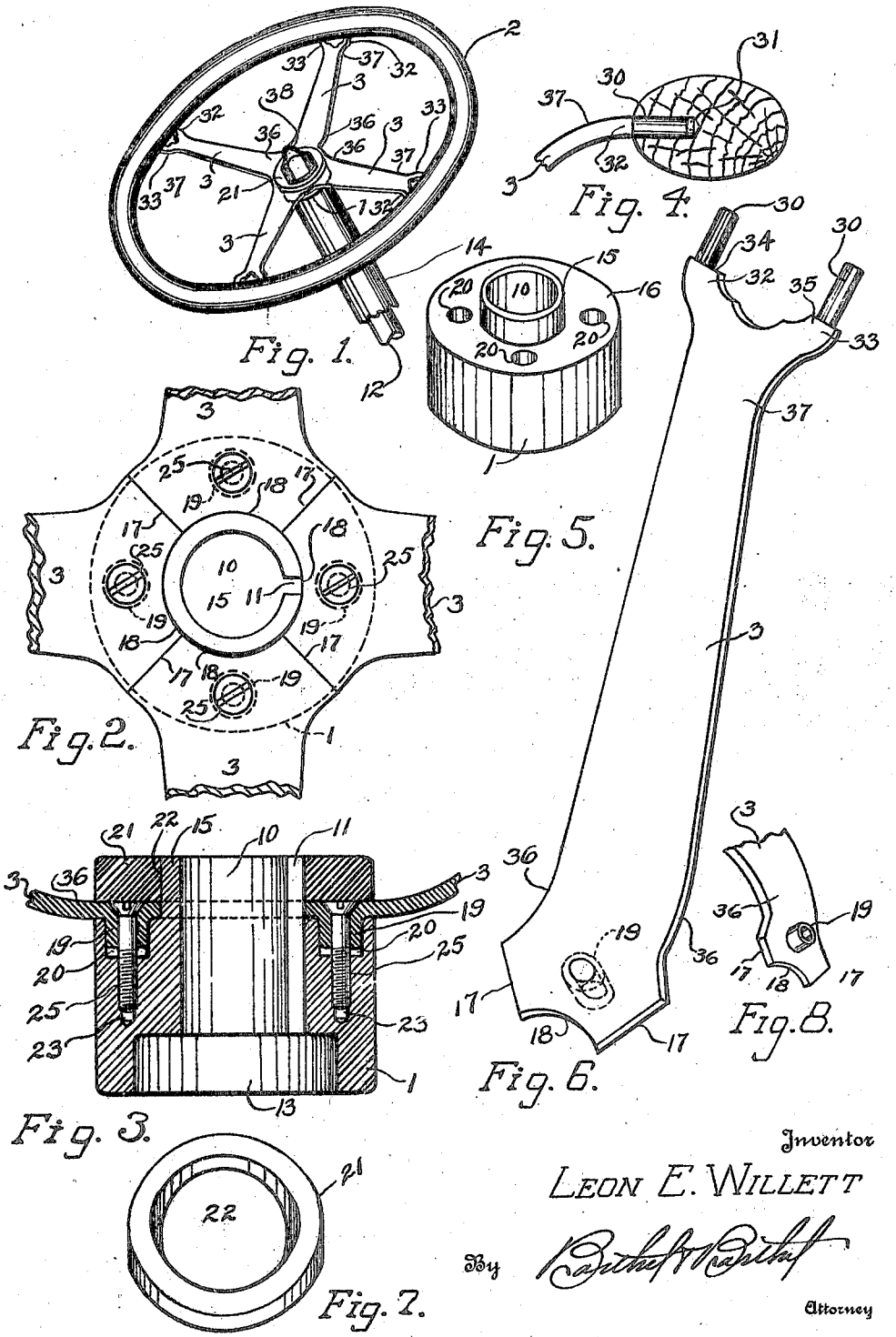

LEON E. WILLETT, OF DETROIT, MICHIGAN.

STEERING WHEEL.

1,417,122. Specification of Letters Patent. Patented May 23, 1922.

Application filed April 2, 1921. Serial No. 457,910.

*To all whom it may concern:*

Be it known that I, LEON E. WILLETT, a citizen of the United States of America, residing at Detroit, in the county of Wayne and State of Michigan, have invented certain new and useful Improvements in Steering Wheels, of which the following is a specification, reference being had therein to the accompanying drawings.

This invention relates to hand wheels and their construction, and more particularly relates to a hand wheel for an automobile steering gear.

The general object of my invention is to provide a simple and efficient hand wheel that is adapted to be applied to the steering column of an automobile whereby the operating shaft of its steering gear may be manually operated and controlled. Another object is to provide a hand wheel that is neat and attractive in appearance, that possesses requisite strength and that may be inherently inexpensive and adapted to economic production.

Still another object is to provide a hand wheel incorporating a composite spider, that is rigid, that may be easily and quickly assembled from previously finished component parts and that after its parts have been assembled neither requires any further finishing nor discloses the composite nature of the structure.

To these and other ends, my invention may consist in a hand wheel for the steering gear of an automobile organized and constructed as shown in the accompanying drawings wherein:

Figure 1 is a fragmentary view of a hand wheel embodying my invention shown mounted on the steering column of an automobile;

Fig. 2 is a fragmentary plan view of the central portion of the assembled spider and its parts with the hub collar removed;

Fig. 3 is a section taken on the line III—III of Fig. 2;

Fig. 4 is a view showing the manner of attachment of the rim end of each of the spokes or arms of the spider to the rim and the connection therebetween, the rim being shown in transverse section and the fragmentary portion of the spider in corresponding elevation;

Figs. 5, 6 and 7 are perspective detail views, respectively, of the hub, a spider arm or spoke and of the hub collar, each shown alone; and Fig. 8 is a perspective fragmentary view of the inner end of one of the spokes looking from the under side of Fig. 6 to more clearly disclose its transversely extending element.

According to my present invention the wheel is built up of a rim and a composite spider comprising a plurality of individual spokes on a common central hub. The wheel including its spider is assembled from its rim inward, that is, the spokes are first attached to the rim and then to their hub. Consequently the spokes may be blanked and formed from sheet metal in a punch press; the hub may be completely finished in a turret lathe or screw machine excepting perhaps for splining and drilling; it is only necessary to provide the wheel with a single central fastening to hold the individual elements of the wheel together as a substantially integral assembled wheel.

Thus in constructing one or more four-spoked steering gear hand wheels, in accordance with a preferred application and embodiment of my invention as illustrated in the drawings; I may provide for each wheel a hub 1, a rim 2 and a set of four individual but mutually identical spokes 3; and assemble each of these elements as hereinafter described.

The hub is interiorly adapted for application and connection to the steering column of a steering gear and exteriorly it is adapted to cooperate with the spokes 3 with which it forms the composite spider of the wheel. The manner of attachment of the hub 1 to a steering gear, depends on the nature and form of the elements of the steering gear to which the wheel is to be applied. Therefore although the hub may be fitted to its steering gear after assembly it is shown provided with a bore 10 splined at 11 for attachment to the end of the rotatable steering gear column or shaft 12, and counterbored at 13 to fit over the tubular casing or jacket 14 for the column. For attachment to the spokes or arms 3 of the wheel spider, the hub 1 is preferably exteriorly flanged or shouldered and the inner end of the arms formed to fit around and be attached to the portions of the hub thus formed. Accordingly an axially extending neck 15 and a substantially radially disposed annular surface 16 are formed on one end, preferably the upper end of the hub; and the cooperating portion, namely the inner end, of each of the spokes 3 is shaped to form, generally, one of a series of segments of an annulus corresponding to the surface 16 and is provided with means preferably attachable or engageable axially of the hub for securing the segments against rotative, radial or transverse movement.

To this end, in carrying out the present embodiment of my invention, the inner end or foot of each of the spokes 3 being substantially one of a series of equally divided segments of the hub shoulder annulus, is a quadrant having a flat top and bottom, with its converging sides or edges 17 radiating from a common center about which is also formed the concave arcuate surface 18 extending therebetween. These surfaces are so proportioned and centered that when the spokes are grouped about the hub as shown in Fig. 2, the opposed surfaces 17 of the various spokes mutually contact and the segmental surfaces 18 bear against the periphery of the neck 15. The anchorage of the segments is preferably obtained by providing between the foot of each of the spokes and the surface 16 of the hub one or more pairs of transversely extending surfaces adapted to cooperate when in engagement to hold the spokes rotatably and radially immovable with respect to the hub and its axis. Accordingly I may attach rigidly to or form integral with the foot of each of the spokes and in symmetrical relation therewith, a laterally extending stud or dowel 19 that is preferably cylindrical in form and adapted to extend in the direction of the axis of the hub when the spoke is mounted thereon. For receiving this stud and thus anchoring the spokes to the hub, the sockets or recesses 20 closely fitting the periphery of the stud are provided in the surface 16 of the hub. These sockets constitute cylindrical cavities arranged at equal intervals about the surface at a distance from the peripheral surface of the neck 15 corresponding to the distance between the arcuate surface 18 and the stud 19 of the spokes, and extend axially of the hub. A collar 21 coextensive with the surface 16 and having a bore 22 adapted to tightly fit over the neck 15 is provided for covering the feet or inner ends of the spokes of the spider when assembled, and to secure the spokes axially to the hub. In some instances, however, I may prefer to provide in addition to the hub collar 21, which when forced into place, exerts an axial pressure on the congregated ends of the spokes, a means for exerting a stress in the direction of the hub axis on each of the spokes individually and independently of one another, and thus hold these spokes in place and secure them to the hub, previously to applying the hub collar 21.

To this end, I provide each of the sockets 20 with a co-axial screwthreaded bore or hole 23 and co-axially perforate and countersink each of the studs 19. Thus when the spokes are assembled or mounted upon the hub 1, each may be individually secured thereto by a screw 25 which being thus located draws the stud 19 into place in its socket 20 and seats the spoke foot upon the surface 16 of the hub without permitting the cramping or disarrangement of the spokes. This additional constrainment not only adds to the security of the fastening of the spokes to the hub but also insures each of the spokes being rigidly attached and held to the hub.

The rim is adapted to be attached to the outer ends of the spokes by being impaled thereon and to this end each of the spokes is provided with one or more tangs or shanks 30, and the rim is provided at suitable intervals with the sockets 31 to receive the elements 30. In order that the tangs 30 may be more readily formed and the spokes having their extremities inserted in the rim present a more attractive appearance I preferably bifurcate the end of the spokes by providing the branches 32 and 33 thereof from or upon which the tangs 30 are formed, preferably integral therewith. The shoulders 34 and 35 at the base of the tangs on the branches 32 and 33 are accordingly quite narrow and fit snugly against the surface of the rim.

It will be observed that the spoke arm 3 is offset at 36 and 37 whereby a dished hand wheel is provided. This feature is taken advantage of in adapting a single length spoke to rims of varying diametrical dimensions, inasmuch as by increasing the nature and the amount of this offset the effective length of the spoke, that is the length of the spoke from the stud 19 to the shoulders 34 and 35 in a direction perpendicular to the hub axis, may be varied.

Presuming that a suitable number of suitably spaced holes 31 have been drilled radially outward from the inner side of the rim 2; the tangs 30 which tightly fit the holes or sockets 31, of each of the spokes are first forced home with the shoulders 34 and 35 of the spokes in contact with the inner side of the rim, the feet of the spokes are assembled on the hub, as shown in Figs. 2 and 3, the screws 25 inserted, and finally the ring 21 forced into place. The wheel is then completely assembled and presuming its interior to have been previously fitted or otherwise adapted, is ready for application to the steering column of a steering gear upon which it may be held in place by the steering column nut 38.

Having thus described my invention, what I claim is:

1. In a hand wheel, the combination with a continuous annular rim, of a spider comprising a hub having an annular substantially radial surface and a neck projecting therefrom, a plurality of spokes adapted to be individually attached at their outer ends to the rim, and each having formed at its inner end an arcuate foot constituting a segment of an annulus corresponding to the annular surface of the hub and having a stud protruding transversely thereof, the feet of said spokes being adapted to be nested together on the annular surface of said hub and about its neck and the hub having provided in its annular surface a socket for receiving the stud of each of the said spokes, and means for holding the spokes axially to the annular surface of said hub and securing the spokes and the hub together.

2. In a hand wheel, the combination with a continuous annular rim, of a spider comprising a hub having an annular substantially radial surface and a neck projecting therefrom, a plurality of spokes adapted to be individually attached at their outer ends to the rim, and each having formed at its inner end an arcuate foot constituting a segment of an annulus corresponding to the annular surface of the hub and having a stud protruding transversely thereof, the feet of said spokes being adapted to be nested together on the annular surface of said hub and about its neck and the hub having provided in its annular surface a socket for receiving the stud of each of the said spokes, and means including a screw passing axially through the stud of each of the spokes and threaded into the hub whereby the spokes will be individually held in place upon and secured to said hub.

3. In a hand wheel, the combination with an annular rim and a plurality of spoke arms, of a hub having a cylindrical neck and an annular shoulder extending radially from said neck to the periphery of the hub and having in said shoulder surface a socket for each of the spokes extending axially of said hub, a longitudinally extending shank formed on the outer extremity of each of the spokes and adapted to enter the rim from its inner side, a stud projecting transversely from the surface of the spoke adjacent its inner end and adapted to enter one of the sockets of the hub, the portion of the spoke adjacent the stud being arcuate in form and adapted to cooperate with the hub neck and with one another to prevent rotational movement of the spoke about its stud, and a collar adapted to fit over the hub neck and the adjacent ends of the spoke.

In testimony whereof I affix my signature in presence of two witnesses.

LEON E. WILLETT.

Witnesses:
GEORGE A. PAGE,
ANNA M. DORR.